United States Patent
Jia et al.

(10) Patent No.: US 9,449,367 B2
(45) Date of Patent: Sep. 20, 2016

(54) PARALLEL PROCESSOR FOR PROVIDING HIGH RESOLUTION FRAMES FROM LOW RESOLUTION FRAMES

(75) Inventors: Yunwei Jia, Thornhill (CA); Paul Wiercienski, Toronto (CA)

(73) Assignee: BROADCOM CORPORATION, Irvine, CA (US)

(*) Notice: Subject to any disclaimer, the term of this patent is extended or adjusted under 35 U.S.C. 154(b) by 1671 days.

(21) Appl. No.: 12/635,550

(22) Filed: Dec. 10, 2009

(65) Prior Publication Data

US 2011/0141348 A1   Jun. 16, 2011

(51) Int. Cl.
*H04N 7/01* (2006.01)
*H04N 11/20* (2006.01)
*G06T 3/40* (2006.01)

(52) U.S. Cl.
CPC ............ *G06T 3/4053* (2013.01); *H04N 7/0117* (2013.01)

(58) Field of Classification Search
CPC ...... H04N 7/01; H04N 11/20; H04N 7/0117; G06T 3/4053
USPC ....... 348/441, 448, 451–452, 458, 625, 631, 348/581, 699
See application file for complete search history.

(56) References Cited

U.S. PATENT DOCUMENTS

| | | | |
|---|---|---|---|
| 6,717,622 B2* | 4/2004 | Lan | 348/625 |
| 2008/0204602 A1* | 8/2008 | Beric et al. | 348/699 |
| 2011/0037894 A1* | 2/2011 | Sbaiz | 348/441 |

* cited by examiner

*Primary Examiner* — Trang U Tran
(74) *Attorney, Agent, or Firm* — Foley & Lardner LLP

(57) ABSTRACT

Presented herein are caching structures and apparatus for use in block based video. In one embodiment, there is described a system receiving lower resolution frames and generating higher resolution frames. The system comprises an upsampling circuit, a first circuit, and a second circuit. The upsampling circuit upsamples a particular lower resolution frame, thereby resulting in an upsampled frame. The first circuit maps frames that are proximate to the particular frame, to the particular frame. The second circuit simultaneously updates the upsampled frame with two or more blocks from at least one of the frames that are proximate to the particular frame.

20 Claims, 10 Drawing Sheets

PARALLEL PROCESSOR FOR PROVIDING HIGH RESOLUTION FRAMES FROM LOW RESOLUTION FRAMES

RELATED APPLICATIONS

This application is related to U.S. patent application Ser. No. 12/614,234, filed on Nov. 6, 2009, which is incorporated herein by reference for all purposes. This application is related to U.S. patent application Ser. No. 12/641,101, filed Dec. 17, 2009.

BACKGROUND OF THE INVENTION

High Definition (HD) displays are becoming increasingly and popular. Many uses are now accustomed to viewing high definition media. However, a lot of media, such as older movies, and shows were captured with in Standard Definition (SD). Since the actual the actual scene was captured by a video camera that only captured the scene in standard definition, even if the display is high definition, there are not enough pixels to take advantage of the display.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

The present invention is directed to parallel processing for providing high resolution frames from low resolution frames, substantially as shown in and/or described in connection with at least one of the figures, as set forth more completely in the claims.

These and other advantages and novel features of the present invention, as well as illustrated embodiments thereof will be more fully understood from the following description and drawings.

DETAILED DESCRIPTION OF PREFERRED EMBODIMENTS

Figure 1:
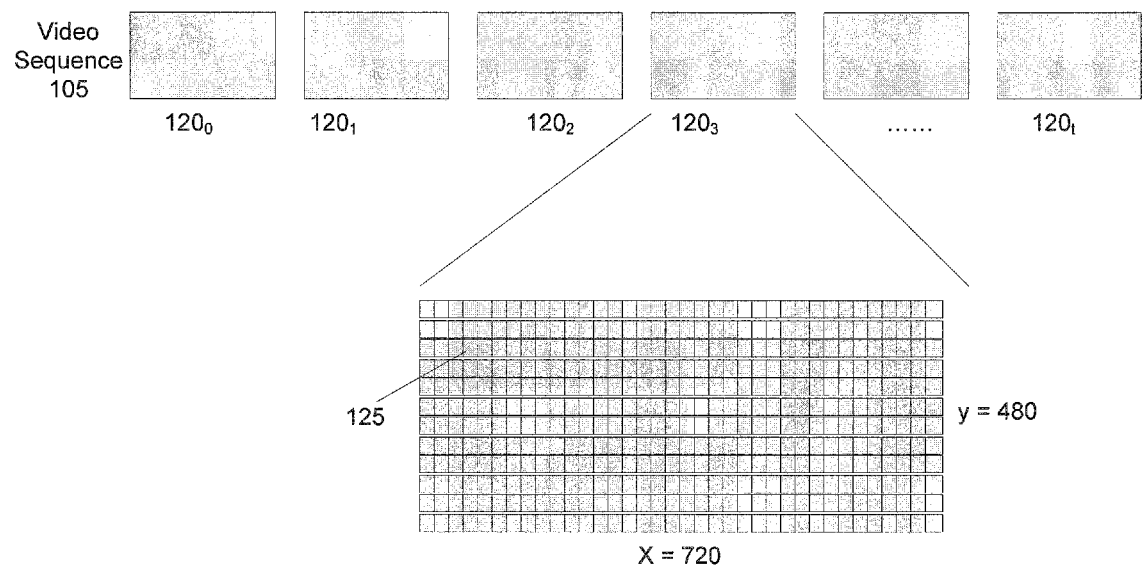
FIG. 1 is a block diagram describing an exemplary video frame capturing a scene at a particular time in lower resolution.

Referring now to FIG. 1, there is illustrated a block diagram describing an exemplary video frame capturing a scene in lower resolution. Video frames 120 are generated by a video camera and represent images captured by the camera at specific time intervals t. A frame $120_0 \ldots t$ represents each image. The frames 120 comprise two-dimensional grids of pixels 125(x,y), wherein each pixel in the grid corresponds to a particular spatial location of an image captured by the camera. Each pixel 125 stores a color value describing the spatial location corresponding thereto.

It is noted that position x,y are discrete variables, that actually correspond to a range $x\Delta x-0.5\Delta x \rightarrow x\Delta x+0.5\Delta x$, $y\Delta y-0.5\Delta y \rightarrow y\Delta y+0.5\Delta y$, in both the scene and the picture, where $\Delta x*\Delta y$ are the dimensions of the pixel. An exemplary standard for frame dimensions is the ITU-R Recommendation Bt.656 which provides for 30 frames of 720×480 pixels per second. Additionally, the pixel value of 125(x, y) is also a discrete value. For example, 24-bit color uses 256 red, 256 blue, and 256 green color values to represent the range of colors that are visible to the human eye.

While the video frames 120 comprise discrete pixels at discrete locations, a real-life scene that is captured is continuous in color and space. Thus, while the position in a scene corresponding to pixel 125(x, y), $x\Delta x-0.5\Delta x \rightarrow x\Delta x+0.5\Delta x$, $y\Delta y-0.5\Delta y \rightarrow y\Delta y+0.5\Delta y$ is within a range that may include several colors. The colors themselves may not necessarily match exactly with any one of the 24-bit colors.

However, the actual color that is recorded by the camera can be modeled as some type of statistical averaging of the colors that appear between $x\Delta x-0.5\Delta x \rightarrow x\Delta x+0.5\Delta x$, $y\Delta y-0.5\Delta y \rightarrow y\Delta y+0.5\Delta y$. The averaging can be a simple averaging of the colors or weighted averaging based on the distance of the point and color from the center x, y. A particular one of the 24-bit colors is selected that most closely approximates the actual color.

The differences between adjacent colors in 24-bit colors are indistinguishable to the human eye. Accordingly, adjacent colors appear continuous. An exemplary standard for display of the video sequence 105 is the ITU-R Recommendation Bt.656 which provides for 30 frames of 720×480 pixels per second. The foregoing picture appears spatially continuous to the viewer. However, although 720×480 pixels appear continuous to the user, information is lost from the original scene, resulting in a loss of detail. For example, fine texture in the scene may be lost.

Figure 2:
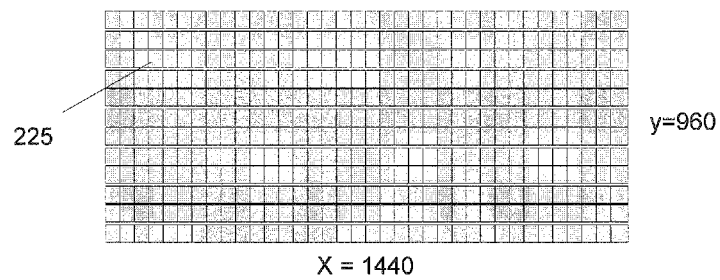
FIG. 2 is a block diagram describing an exemplary video frame capturing the scene at the same time in higher resolution.

Referring now to FIG. 2, there is illustrated a block diagram describing an exemplary video frame capturing the scene 100 in higher resolution. The higher resolution is double the resolution in both the x and y directions, e.g., 960V×1440H pixels, in the present example, however it should be understood that other multiples, integer or non-integer, may be used. It should also be understood that the multiples in the x and y directions are not necessarily the same.

Thus pixels 225($x,y$) are discrete variables, that actually correspond to a range $0.5x\Delta x-0.25\Delta x \rightarrow 0.5x\Delta x+0.25\Delta x$, $0.5y\Delta y-0.25\Delta y \rightarrow 0.5y\Delta y+0.25\Delta y$, in both the scene and the picture, where $0.5\Delta x*0.5\Delta y$ are the dimensions of the pixel. As in the case of lower resolution, the pixel value of 225($x, y$) is also a discrete value. For example, 24-bit color uses 256 red, 256 blue, and 256 green color values to represent the range of colors that are visible to the human eye.

The position in a scene corresponding to pixel 1125($x, y$), $0.5x\Delta x-0.25\Delta x \rightarrow 0.5x\Delta x+0.25\Delta x$, $0.5y\Delta y-0.25\Delta y \rightarrow 0.5y\Delta y+0.25\Delta y$ is also within a range that may include several colors. The colors themselves may not necessarily match exactly with any one of the 24-bit colors. The actual color that is recorded by the camera can be modeled as some type of statistical averaging of the colors that appear between $0.5x\Delta x-0.25\Delta x \rightarrow 0.5x\Delta x+0.25\Delta x$, $0.5y\Delta y-0.25\Delta y \rightarrow 0.5y\Delta y+0.25\Delta y$. The averaging can be a simple averaging of the colors or weighted averaging based on the distance of the point and color from the center x, y. A particular one of the 24-bit colors is selected that most closely approximates the actual color.

The foregoing higher resolution picture more accurately captures the scene and provides greater detail, including finer texture than the lower resolution picture. However, a lot of media, such as older movies, and shows were captured with in Standard Definition (SD), while high definition displays are becoming increasingly common.

When a scene is captured in lower resolution, although the continuous detail of the scene is not known, information about the scene as a series of ranges $x\Delta x-0.5\Delta x \rightarrow x\Delta x+0.5\Delta x$, $y\Delta y-0.5\Delta y \rightarrow y\Delta y+0.5\Delta y$ is known. The image of FIG. 2 is the gold standard, higher resolution image. However, the gold standard higher resolution image includes information from the scene at $0.5x\Delta x-0.25\Delta x \rightarrow 0.5x\Delta x+0.25\Delta x$, $0.5y\Delta y-0.25\Delta y \rightarrow 0.5y\Delta y+0.25\Delta y$, which is not available.

Figure 3:
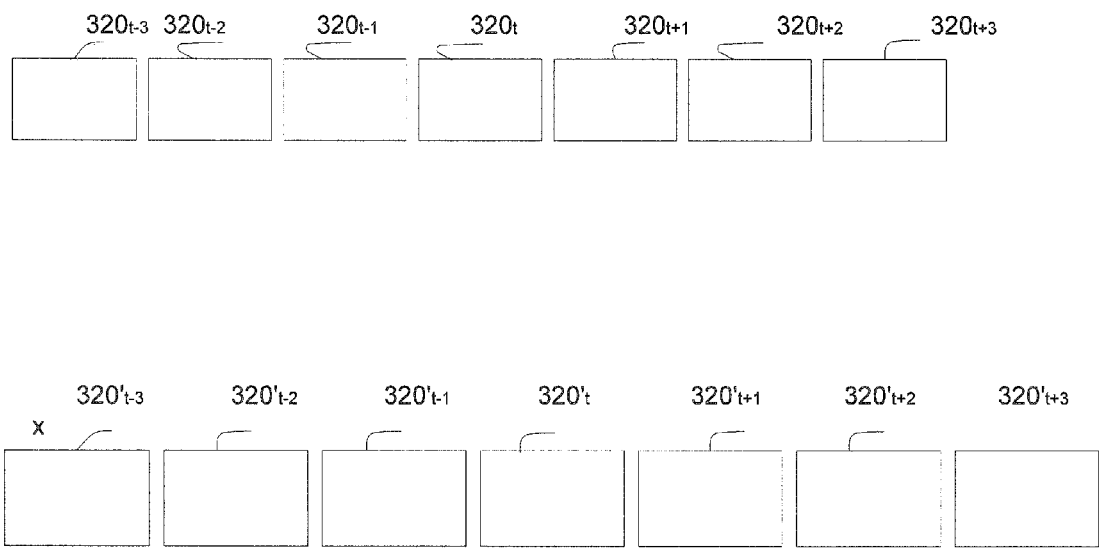
FIG. 3 is a block diagram describing upscaling lower resolution frames to higher resolution in accordance with an embodiment of the present invention.

Nevertheless, the foregoing information can be estimated by up-sampling the low resolution frame using any one of a variety of techniques such as spatial interpolation, or filtering. The foregoing results in an estimated higher resolution frame. Exemplary upsampled frames 320 that estimate the higher resolution frame are shown in FIG. 3.

The foregoing can be done with each of the low resolution frames that are captured at other times, e.g., t−3, t−2, t−1, t, t+1, t+2, t+3 . . . , resulting in upsampled frames $320_{t-3}$, $320_{t-2}$, $320_{t-1}$, $320_t$, $320_{t+1}$, $320_{t+2}$, $320_{t+3}$. However, it should be noted that with recursion, the processing for higher resolution frames prior to $320_t$ was completed prior to processing of frame $320_t$. Accordingly, these frames are now designated $320_{t-3}'$, $320_{t-2}'$, $320_{t-1}'$. Frames $320_{t+1}$, $320_{t+2}$, $320_{t+3}$ are not yet completely processed.

Figure 4:
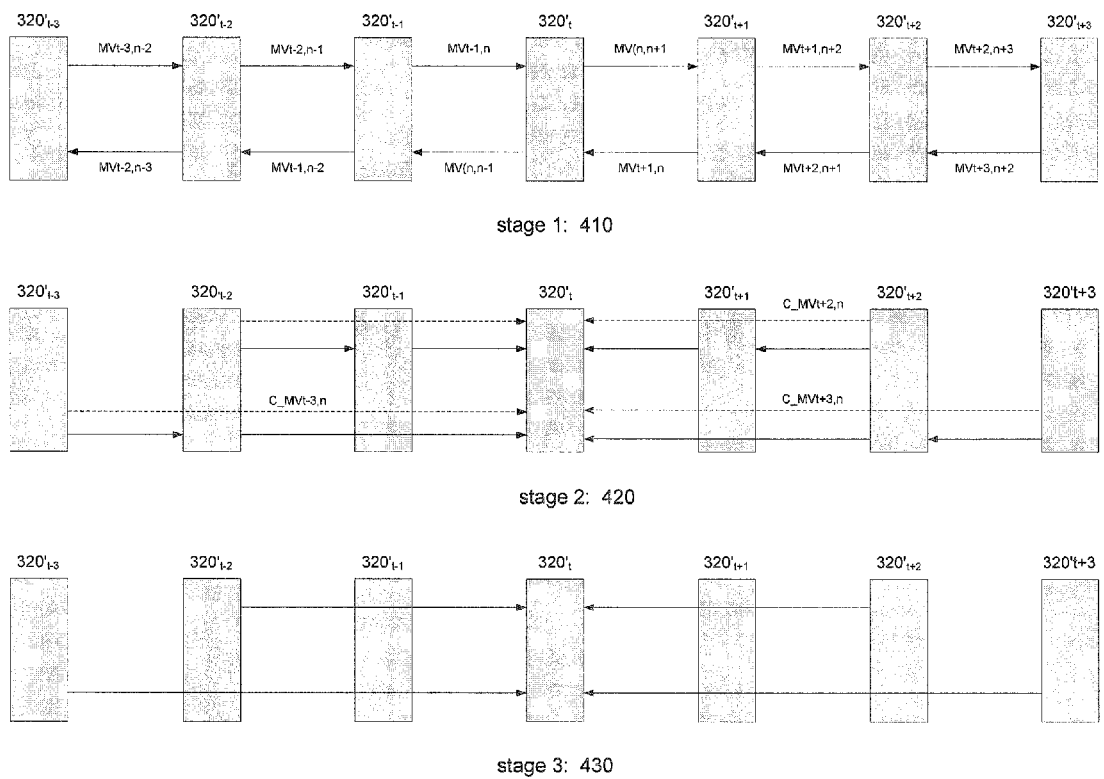
FIG. 4 is a block diagram describing motion estimation in accordance with an embodiment of the present invention.

Information from proximate time periods can be used to improve the quality of frame $320_t$. To achieve this, the motion between proximate input frames may be required. The foregoing will now be described with reference to FIG. 4. FIG. 4 is an illustration of an exemplary motion estimation process using stages. The purpose of the proposed method of motion estimation using staged procedures is to achieve a large effective search area by covering small actual search areas in each motion estimation stage. This is especially useful when a large number of low resolution frames are used to generate a high resolution frame, since in that case, the motion between two non-adjacent frames may be relatively substantial. For example, locating a best matching block in a frame that is substantially distant in time, may require the search of a large frame area.

ME stage 1: In the first stage, details of which are shown in 410, motion estimation is performed between pairs of neighboring frames $320_{t-3}'$ and $320_{t-2}'$, $320_{t-2}'$ and $320_{t-1}'$, $320_{t-1}'$ and $320_t$, $320_t$ and $320_{t+1}$, $320_{t+1}$, $320_{t+2}$, $320_{t+2}$ and $320_{t+3}$. For each pair of neighboring frames, two motion estimations are performed.

In the first motion estimation, the earlier frame is the reference frame and divided into predetermined sized blocks, e.g., $320_{t-1}'$. The later frame $320_t$ is the target frames and is searched for a block that matches $320_{t-1}'$. In the second motion estimation, the later frame is the reference frame and divided into predetermined sized blocks, e.g., $320_t$. The earlier frame $320_{t-1}'$ is the target frame and is searched for a block that matches $320_t$.

Motion estimation in this stage is based on full-search block matching, with (0, 0) as search center and a rectangular search area with horizontal dimension search_range_H and vertical dimension search_range_V. The reference frame is partitioned into non-overlapping blocks of size block_size_H×block_size_V. Next, for a block R in a reference frame with top-left pixel at (x, y), the corresponding search area is defined as the rectangular area in the target frame delimited by the top-left position (x−0.5*search_range_H, y−0.5*search_range_V) and its bottom-right position (x+0.5*search_range_H1/2, y+0.5*search_range_V1), where search_range_H and search_range_V are programmable integers. Thereafter, in searching for the best-matching block in the target frame for the block R in the reference frame, R is compared with each of the blocks in the target frame whose top-left pixel is included in the search area. The matching metric used in the comparison is the sum of absolute differences (SAD) between the pixels of block R and the pixels of each candidate block in the target frame. If, among all the candidate blocks in the search area, the block at the position (x', y') has the minimal SAD, then the motion vector (MV) for the block R is given by (MVx, MVy) where MVx=x−x', and MVy=y−y'.

As noted above, with recursion, the processing of frames $320_{t-3}'$, $320_{t-2}'$, $320_{t-1}'$ is completed. While frames $320_{t-3}'$ . . . $320_{t+3}$ are a window for $320_t$. During processing of $320_{t-1}'$, the upsampling was performed for all of the time periods except t+3, and motion estimation would be performed for all of the foregoing pairs except for $320_{t+2}$ and $320_{t+2}$. All the other motion estimation results are available from previous processing due to pipelined processing of consecutive images. Thus, only the foregoing motion estimation needs to be computed at this stage, provided the previous motion estimation results are properly buffered and ready to be used in the next two stages of motion estimation.

After the first stage of motion estimation, the next two stages are preferably performed in the following order at frame level: first, stages 2 and 3 for $320_{t-2}'$ and $1320_{t+2}$, then stage 2 and 3 for $320_{t-2}'$ and $320_{t+2}$.

ME stage 2: In this stage, details of which are shown in 420, the motion vectors between non-adjacent frames are predicted based on the available motion estimation results. The predicted motion vectors will be used as search centers in stage 3. For example, the predicted motion vectors between $320_{t+2}$ as the reference frame and $320_t$ as the target frame, can be represented as C_MV(t+2, t). To determine C_MV(t+2, t), MV(t+2, t+1) and MV(n+1, t) are combined, both being available from the previous stage of motion estimation processing.

Figure 5:
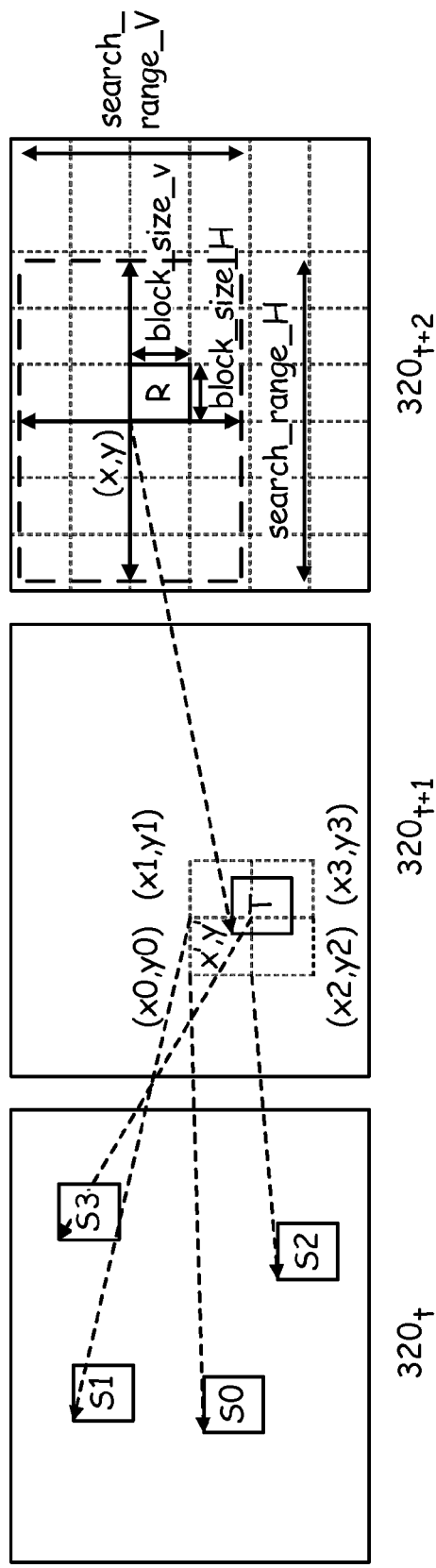
FIG. 5 is a block diagram describing motion estimation between non-adjacent frames in accordance with an embodiment of the present invention.

For example, as shown in FIG. 5, a block R at location (x, y) in $320_{t+2}$ may have its best-matching block in $320_{t+1}$ as block T, which is determined in the motion estimation between $320_{t+2}$ as the reference frame and $320_{t+1}$ as the target frame. Note that although R is aligned with the block grids, for example, x % block_size_H1=0 and y % block_size_V1=0, T may not be aligned with the block grid of its frame, and may be located anywhere in the search area. Block T may contain pixels from up to four grid-aligned blocks in $302_{t+1}$ whose top-left pixels are at (x0, y0), (x1, y1), (x2, y2), and (x3, y3), respectively. In case of less than four grid-aligned blocks covered by T, some of the four top-left pixels overlap.

The predicted motion vector for R from $320_{t+2}$ to $320_t$ may be set as the summation of the motion vectors for the block R from $320_{t+2}$ to $320_{t+1}$ and the median of the motion vectors for the block T from $320_{t+1}$ to $320_t$, as shown in Equation 1:

$$C\_MV(t+2,t,x,y)=MV(t+2,t+1,x,y)+\text{median} \\ (MV(t+1,t,xi,yi),i=0,1,2,3) \quad (1)$$

where the median of a set of motion vectors may be the motion vector with the lowest sum of distances to the other motion vectors in the set. For example, consider each motion vector in the set as a point in the two dimensional space, and calculate the distance between each pair of motion vectors in the set. The median of the set may then be the motion vector whose summation of the distances to other motion vectors is minimal among the motion vectors in the set. Note that in other embodiments, the distance between two motion vectors may be calculated as the Cartesian distance between the two points corresponding to the two motion vectors, or it may be approximated as the sum of the horizontal distance and the vertical distance between the two motion vectors to reduce computing complexity.

Similarly, the predicted motion vectors from $320_{t+3}$ as the reference frame to $320_t$ as the target frame is obtained by cascading the motion vectors from $320_{t+3}$ to $320_{t+2}$ with the motion vectors from $320_{t+2}$ and $320_t$. The predicted motion vectors from $320_{t-3}'$ and $320_t$ can be obtained in a similar manner.

In another embodiment of this invention, in predicting the motion vector for R from non-adjacent frames, the median operator in Equation 1 may be replaced with the arithmetic average of the four motion vectors. In another embodiment, in predicting the motion vector for R, the minimal SAD between the block T and each of the four blocks Si (i=1, 2, 3, 4) may be used in Equation 1 to replace the median of the four motion vectors. In yet another embodiment of this invention, in predicting the motion vector, one may calculate the SAD corresponding to each of the following four motion vectors: MV(t+2,t+1,x,y)+MV(t+1,t,xi,yi) (i=0,1,2,3), and choose the one with the minimal SAD.

ME stage 3: In the last stage, 430 of FIG. 4, of processing in the motion estimation block, the predicted motion vectors are refined to determine to determine motion vectors between $320_{t+k}$, $320_t$ for (k=-3, -2, 2, 3), by searching around the corresponding predicted motion vectors. For example, to determine the motion vectors, a block-based motion estimation is performed with a search center at (x+C_MVx(t+k, t), y+C_MVy(t+k, t)) and a search areas (search_range_H2, search_range_V2) and (search_range_H3, search_range_V3), where the foregoing are programmable integers representing respectively the horizontal search range and vertical search range. The search range at this stage may be set to be smaller than that in the stage 1 of motion estimation to reduce the computational complexity of motion estimation.

Motion-Compensated Back Projection

Subsequent to motion estimation processing, the image $320_t'$ is subjected to processing for motion-compensated back projection (MCBP). The inputs to this block are the frames and motion estimation results from $320_{t+k}$, (k=-3, -2, -1, 1, 2, 3), and frame $320_t$.

MCBP favors frames that are temporally close to $320_t$ over frames further away. Temporally close frames are favored because motion estimation is generally more reliable for a pair of frames with a smaller temporal distance than that with a larger temporal distance. Also, this ordering favors the motion estimation results of prior frames over later frames. Thus, MCBP follows the order t-3, t+3, t-2, t+2, t-1, t+1.

Figure 6:
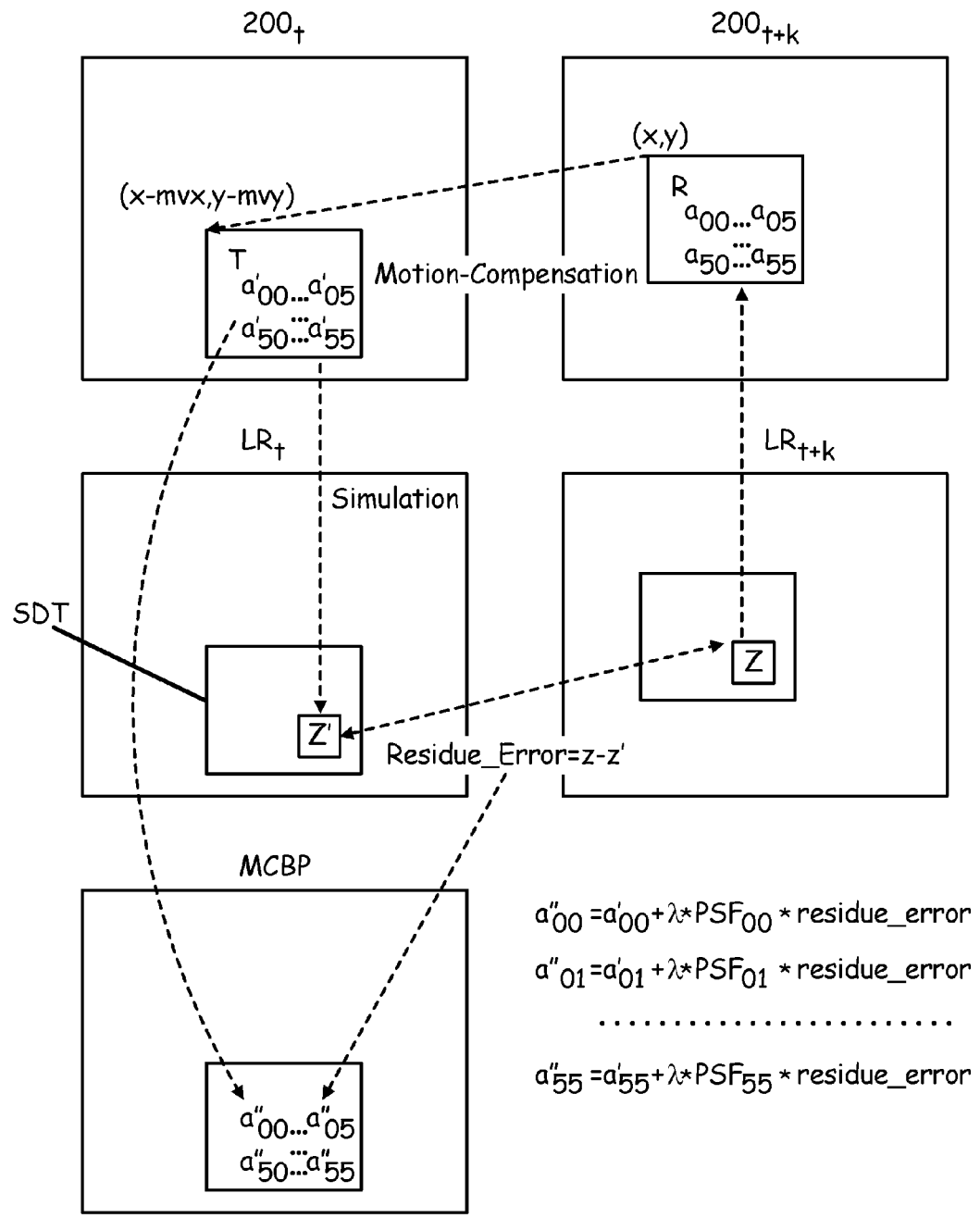
FIG. 6 is a block diagram describing motion compensated back projection in accordance with an embodiment of the present invention.

Referring now to FIG. 6, there is illustrated a block diagram describing motion compensated back projection between two frames in accordance with an embodiment of the present invention.

In a first step, for each block-grid-aligned block R in $320_{t+3}$, the corresponding motion-compensated block T in $320_t$ is found using the motion estimation results. For example, if block R is at the position (x, y) in $320_{t+3}$ and its motion vector is (mvx, mvy), the corresponding motion compensated block T is the block at the position (x-mvx, y-mvy) in $320_t$.

In a second step, for each pixel z in the low resolution frame LR(n+3) within the spatial location of block R, the corresponding pixels are identified in block R of $320_{t+3}$ based on a pre-determined spatial window, for example, $a_{00} \ldots a_{55}$, and consequently the corresponding pixels in block T of $320_t$, for example, $a'_{00} \ldots a'_{55}$. From the identified pixels in $320_t$ a simulated pixel z' corresponding to z is generated. Note that the simulated pixel z' may not necessarily co-site with an existing pixel of LR(n): the pixel z' co-sites with an existing pixel of LR(n) if and only if both mvx and mvy are integers in terms of the resolution of LR(t). For example, in the case of using spatial interpolation to up-scale LR(t) by three both horizontally and vertically, the simulated pixel z' co-sites with an existing pixel of LR(t) if and only mvx % 3=0 and mvy % 3=0.

In the second step above, to identify the pixels in $320_t$ corresponding to the pixel z in LR(t+3) and simulate the pixel z' from these pixels, ideally, the point spread function (PSF) in the image acquisition process is required. Since PSF is generally not available to high-resolution processing and it often varies among video sources, an assumption may be made with regard to the PSF, considering both the required robustness and computational complexity.

For example, a poly-phase down-sampling filter may be used as PSF. The filter may consist, for example, of a 6-tap vertical poly-phase filter and a consequent 6-tap horizontal poly-phase filter. As shown in FIG. 6, the pixel z in LR(n+3) corresponds to the pixels $a_{00}$ to $a_{55}$ in $1320_{t+3}$ through the PSF; and the pixels $a_{00}$ to $a_{55}$ correspond to the pixels $a'_{00}$ to $a'_{55}$ in $1320_t$ through the motion vector (mvx, mvy); therefore, the pixels in $1320_t$ corresponding to z are $a'_{00}$ to $a'_{55}$ and the simulated pixel z' is:

$$z' = \sum_{i=0}^{5} \sum_{j=0}^{5} PSF_{ij} * a'_{ij} \quad (2)$$

where $PSF_{ij}$ is the coefficient in the PSF corresponding to $a'_{ij}$. In another embodiment of this invention, a bi-cubic filter may be used as the PSF.

In a third step, the residue error between the simulated pixel z' and the observed pixel z is computed, as residue_error=z-z'.

In a fourth step, the pixels in $320_t$ can be updated for example, from pixels $a'_{00} \ldots a'_{55}$ in $320_t$ to pixels $a''_{00} \ldots a''_{55}$, according to the calculated residue error as shown at the bottom right in FIG. 6.

In the fourth step above, the residue error is scaled by $\lambda*PSF_{ij}$ and added back to the pixel $a'_{ij}$ in $320_t$ to generate the pixel $a''_{ij}$. The purpose of $PSF_{ij}$ is to distribute the residue error to the pixels $a'_{ij}$ in $320_t$ according to their respective contributions to the pixel z'. As proposed herein, the purpose of the scaling factor $\lambda$ is to increase the robustness of the algorithm to motion estimation inaccuracy and noise. $\lambda$ may be determined according to the reliability of the motion estimation results for the block R. The motion estimation results can include (mvx, mvy, sad, nact). Among the eight immediate neighboring blocks of R in $320_{t+3}$, let sp be the number of blocks whose motion vectors are not different from (mvx, mvy) by 1 pixel (in terms of the high-resolution), both horizontally and vertically. In an embodiment of this invention, $\lambda$ may be determined according to the following formula:

$$\begin{aligned}
&\text{if} & sp \geq 1 \,\&\&\, sad < nact*4/4 & \quad \lambda = 1; \\
&\text{else if} & sp \geq 2 \,\&\&\, sad < nact*6/4 & \quad \lambda = 1/2; \\
&\text{else if} & sp \geq 3 \,\&\&\, sad < nact*8/4 & \quad \lambda = 1/4; \\
&\text{else if} & sp \geq 4 \,\&\&\, sad < nact*10/4 & \quad \lambda = 1/8; \\
&\text{else} & sp \geq 5 \,\&\&\, sad < nact*12/4 & \quad \lambda = 1/16; \\
&\text{else} & & \quad \lambda = 0;
\end{aligned} \quad (3)$$

conveying that the contribution from the residue error to updating the pixels in $320_t$ should be proportional to the reliability of the motion estimation results. This proportionality is measured in terms of motion field smoothness, represented by the variable sp in the neighborhood of R and how good the match is between R and T, for example, as represented by comparison of sad and nact.

Note that, in FIG. 6, if the simulated pixel z' co-sites with an existing pixel in LR(n), $\lambda$ is reduced by half, which implies the updating back-projection strength from the residue error is reduced by half. A reason for this is that, in the case that z' co-sites with an existing pixel in LR(n), the pixel z' is a version of the pixel z that is simply shifted an integer number of pixels, and hence it does not provide much additional information in terms of resolution enhancement. However, it may be helpful in reducing noise.

In another embodiment of this invention, in calculating the scaling factor $\lambda$, the reliability of the motion estimation results may be measured using the pixels in $320_t$ and $320_{t+3}$ corresponding to the pixel z, i.e., $a_{00} \ldots a_{55}$ in $320_{t+3}$ and $a'_{00} \ldots a'_{55}$ in $320_t$. For example, sad and nact may be computed from these pixels only instead from all the pixels in R and T.

For example, if the block size is 4×4 pixels, the sad between R and T may be defined as in Equation 4:

$$sad = \sum_{i=-1}^{4} \sum_{j=-1}^{4} |R_{i,j} - T_{i,j}| \quad (4)$$

and act of R may be defined as in Equation 5:

$$act = \sum_{i=-1}^{3} \sum_{j=-1}^{4} |R_{i,j} - R_{i+1,j}| + \sum_{i=-1}^{4} \sum_{j=-1}^{3} |R_{i,j} - R_{i,j+1}| \quad (5)$$

where $R_{i,j}$ refers to the i,j pixel of R, and likewise $T_{i,j}$ refers to the i,j pixel of T. Block R is a rectangular area with a top-left pixel of $R_{0,0}$ and a bottom right pixel of $R_{3,3}$, likewise block T is a rectangular area with a top-left pixel of $T_{0,0}$ and a bottom right pixel of $T_{3,3}$. Equations (4) and (5) are indicative of the fact that the pixels surrounding R and T may also be used in the computation of sad and act. The activity of a block may be used to evaluate the reliability of corresponding motion estimation results. To accurately reflect reliability, act may have to be normalized against the corresponding SAD in terms of the number of absolute pixel differences, as shown below in Equation 6:

$$nact = \frac{act * num\_pixels\_in\_sad}{num\_pixels\_in\_act} \quad (6)$$

where num_pixels_in_sad is the number of absolute pixel differences in the calculation of sad, and num_pixels_in_act is that of act, respectively. The term nact is the normalized activity of the block. Note that the surrounding pixels of R and T may be used in calculating sad and act as well.

The foregoing can be repeated for the frames for each time period t-3, t-2, t-1, t+1, t+2, and t+3, resulting in a motion compensated back predicted higher resolution frame $320_t'$.

Motion Free Back Projection

Figure 7:
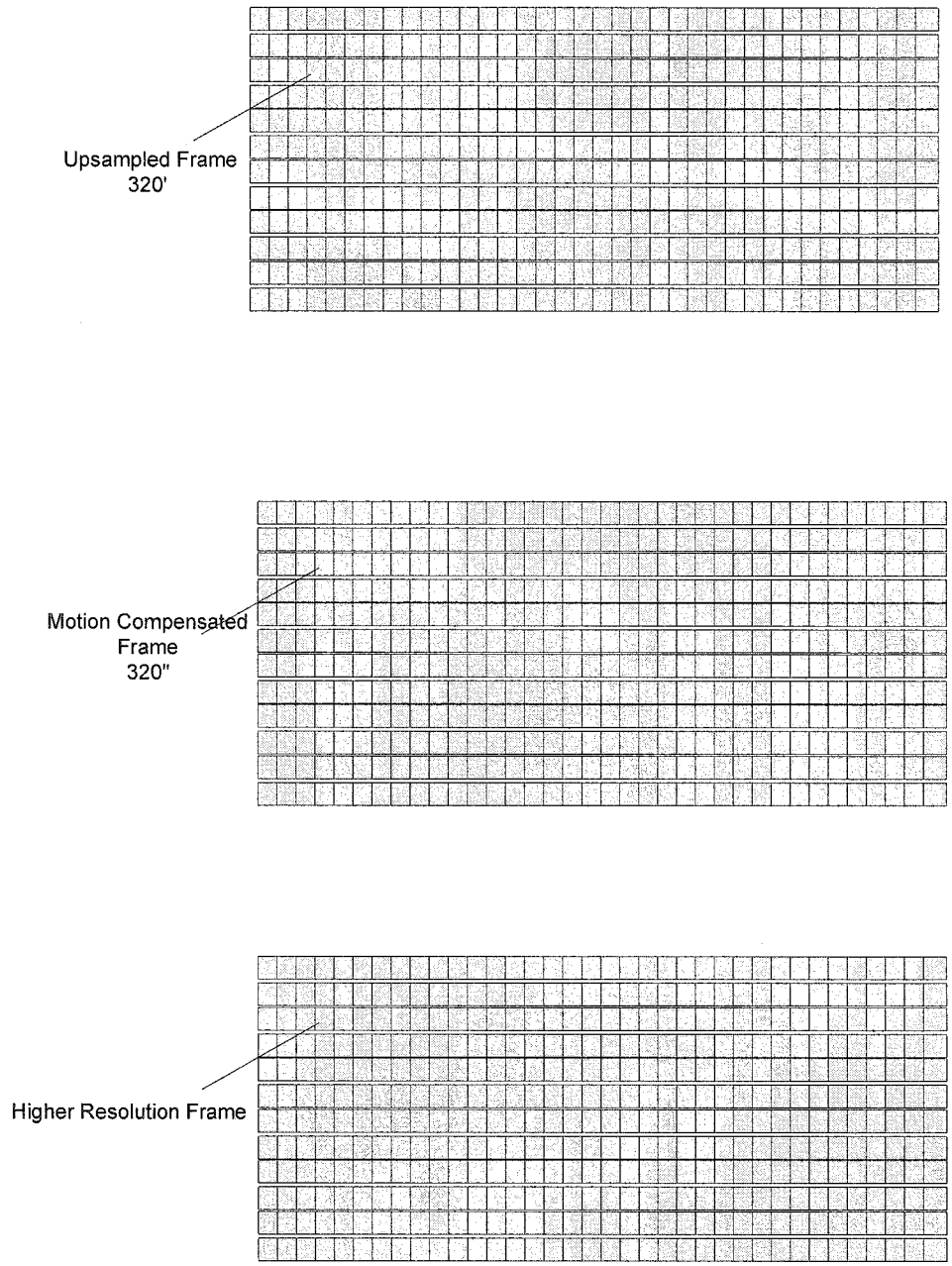
FIG. 7 is a block diagram describing motion free back projection in accordance with an embodiment of the present invention.

Referring now to FIG. 7, there is illustrated a block diagram describing motion-free back projection in accordance with an embodiment of the present invention. Subsequent to motion compensated back projection, the image $320_t'$ is subjected to processing for motion-free back projection (MCBP). The inputs to this block are the frame $320_t'$, and motion compensated back predicted higher resolution frame $320_t''$. The output from the MCBP processing block is the high resolution frame.

Motion-free back projection between frame $320_t'$ and frame $320_t''$ are performed similar to motion-compensated back projection, except that all motion vectors are set to zero and the weighting factor $\lambda$ is a constant.

Figure 8:
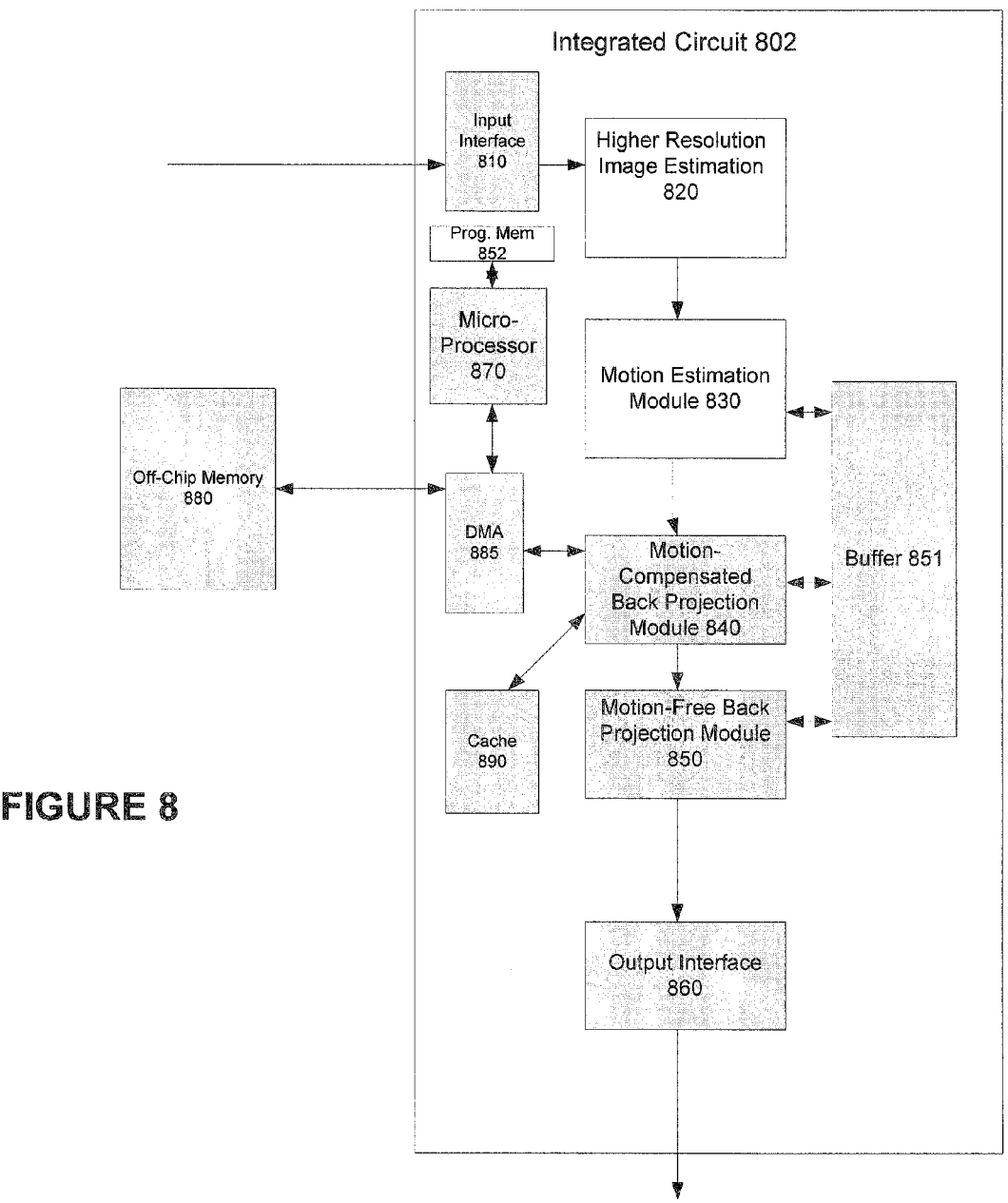
FIG. 8 is a block diagram of an integrated circuit and off-chip memory in accordance with an embodiment of the present invention.

FIG. 8 is an illustration of an exemplary block diagram of a system in accordance with an embodiment of the present invention. The system comprises an integrated circuit 802 comprising high resolution image estimation module 820 that generates an initially estimated high resolution image by processing images. Also included are a motion estimation module 830 for motion estimation, a motion-compensated back projection module 840, a direct memory access 885, and a cache 890 for motion-compensated back projection, and a motion-free back projection module 850 for motion-free back projection.

The modules 820-840 can be implemented in software, firmware, hardware (such as processors or ASICs which may be manufactured from or using hardware description language coding that has been synthesized), or using any combination thereof. The embodiment may further include a processor 870, and an input interface 810 through which the lower resolution images are received and an output interface 860 through which the higher resolved images are transmitted.

An off-chip memory 880 stores data after interpolation, after motion estimation 830, and after the motion compensation back projection 840. On-chip memory 851 stores portions of the higher resolution frames that are being updated. Program memory 852 stores instruction for execution by the processor 870.

It is noted that the foregoing image processing involves the transfer and processing of large amounts of data. Storing larger amounts of the data within the integrated circuit 802 increases the cost and consumes more area on the integrated circuit 802. Storing larger amounts of data in the off-chip memory 880 results in lower access times, and consequently, lower throughput.

In certain embodiments of the present invention, the pixels in the low-resolution frames are traversed according to a certain temporal and spatial order, and the motion-compensated back-projection processes for all the low-resolution pixels are serialized. The motion-compensation back-projection for a low-resolution pixel runs to its completion before the motion-compensation back-projection for the next low-resolution pixel begins. For each low-resolution pixel, the corresponding high-resolution pixels are read from memory, updated, and then written back to the memory. In a real-time system, the foregoing processes for all the low-resolution pixels may be completed in a fixed frame interval.

The foregoing may advantageously use very small, shared on-chip storage that is enough to hold the high-resolution pixels to be updated for a low-resolution pixel. Additional bandwidth can be allocated for reading/writing the high-resolution pixels to/from off-chip memory.

In another embodiments, each low-resolution frame may have its own high-resolution buffer for MCBP to work on. At any point of time, a portion of the pixels in a high-resolution buffer corresponding to a low-resolution frame may be retired from the MCBP if they are no longer impacted by the MCBP process for the remainder pixels in the low-resolution frame. The retired pixels from the high-resolution buffer may be conceptually moved to another high-resolution buffer corresponding to the next low-resolution frame, and the high-resolution pixels that are no longer impacted by any low-resolution pixels are output to HR(t). This approach may use a small amount of bandwidth for reading/writing the high-resolution frame to/from off-chip memory, and a low operating frequency since this approach may allow parallel processing of the multiple MCBP processes for the multiple low-resolution frames. Additionally, on-chip storage can be allocated to hold the multiple high-resolution buffers.

MCBP may require significant computation resources, such as bandwidth, storage, and computational cycles. This is especially true in a real-time, embedded environment. Therefore, methods of implementing MCBP are needed that are efficient in terms of computation resources and also can offer various trade-offs among these resources.

In certain embodiments of the invention, a patch of pixels in higher resolution frame $320_t$ is processed to completion in the MCBP processes using all the low-resolution frames LR.

Figure 9:
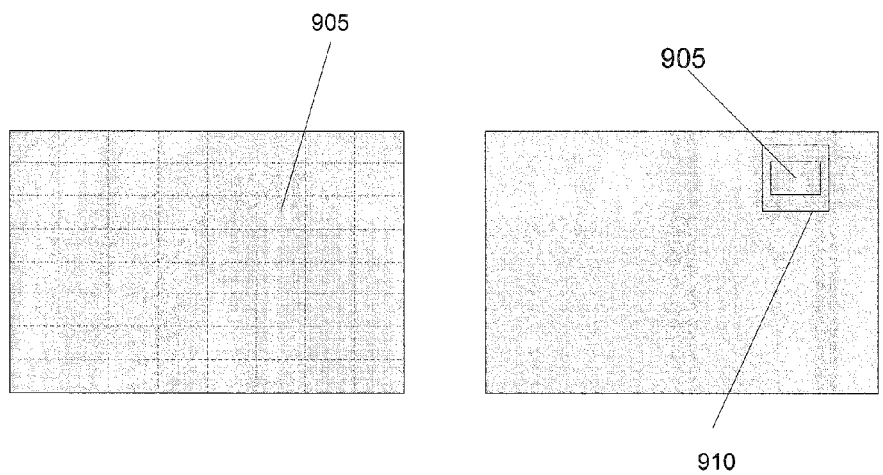
FIG. 9 is a block diagram of a higher resolution frame partition into blocks in accordance with an embodiment of the present invention.

Referring now to FIG. 9, there is illustrated a block diagram of the higher resolution frame $320_t$ partitioned into non-overlapping blocks 905, each block 905 having a size of dest_size_x*dest_size_y, which respectively represent the horizontal size and vertical size of the block. Shown on the left of FIG. 9 is such a partition. For a block 905 at the position (m*dest_size_x, n*dest_size_y) in the partition, define its corresponding back-projection patch as the rectangle delimited by its top-left pixel $$\left( \begin{array}{l} m^*\text{dest\_size\_x} - \frac{\text{patch\_size\_x} - \text{dest\_size\_x}}{2}, \\ n^*\text{dest\_size\_y} - \frac{\text{patch\_size\_y} - \text{dest\_size\_y}}{2} \end{array} \right)$$

and its bottom-right pixel $$\left( \begin{array}{l} (m+1)^*\text{dest\_size\_x} - 1 + \frac{\text{patch\_size\_x} - \text{dest\_size\_x}}{2}, \\ (n+1)^*\text{dest\_size\_y} - 1 + \frac{\text{patch\_size\_y} - \text{dest\_size\_y}}{2} \end{array} \right)$$

where patch_size_x and patch_size_y represent respectively the horizontal size and vertical size of the patch. Each block 905 has a corresponding back-projection patch 910. Note that the two patches of two neighboring blocks in the partition may overlap each other.

Following a raster-scan order, each patch 910 is motion compensation back projected for the pixels in LR(n−k), . . . , LR(n+k) (or any other temporal order of them). After the MCBP processes are completed for the patch, the center block 905 in the patch and of size dest_size_x by dest_size_y is output.

It is noted that in the MCBP processes for the patch 910, all the pixels in the patch may be updated, but only the pixels at the center block 905 are output. The boundary pixels, the pixels that are in the patch 910 but not in the block 905 may have impact on the inner pixels in the patch during the MCBP process. Additionally, the boundary pixels may be further impacted by the MCBP processes of the neighboring patches 910.

Figure 10:
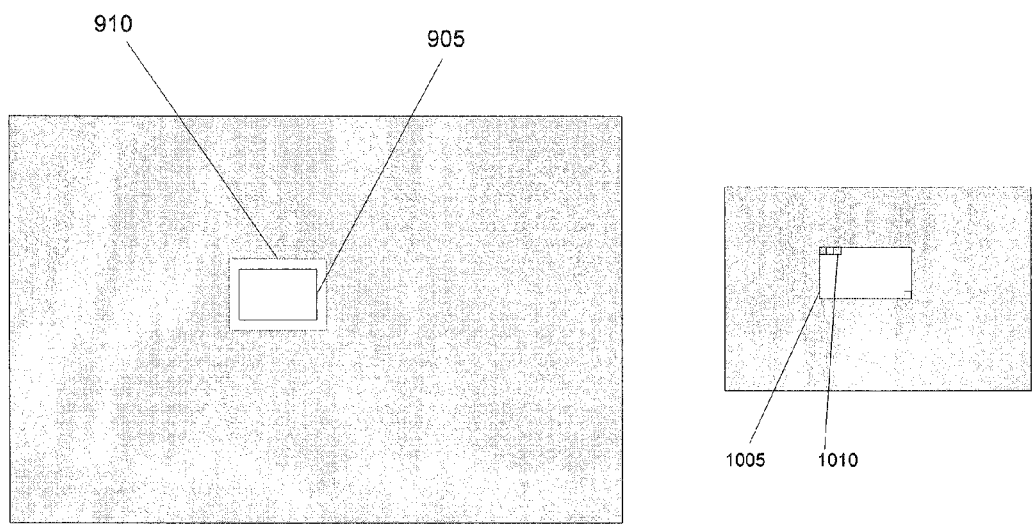
FIG. 10 is a block diagram of a destination domain in accordance with an embodiment of the present invention.

Referring now to FIG. 10, there is illustrated a block diagram of a patch 910 and an the area 1005 in a low-resolution frame LR(n+j) that potentially impacts the patch 910 in MCBP, with the area being defined as the set of the blocks 1010 (each of size block_size_x*block_size_y) in LR(n+j) that, after motion-compensation, may potentially back-project into the patch.

It is noted that the total number of blocks in the above defined area in LR(n+j) may increase with the motion range between LR(n+j) and LR(n), and this number may potentially become quite large. However, quite often, only a portion of the blocks in the area can actually be back-projected into the patch after considering their corresponding motion vectors, and this portion may become even smaller if some conditions on the motion vectors are imposed for a block to be used in MCBP. Therefore, to reduce the requirements on bandwidth for accessing low-resolution blocks, an upper-limit on the number of blocks that can be used in MCBP is imposed for a patch 910. An example of such upper-limit is γ*(patch_size_x/block_size_x)*(patch_size_y/block_size_y), where γ is a constant parameter.

In one embodiment, all the blocks in the area can be scanned in the low-resolution frame corresponding to a patch 910. Each qualified block is processed in the MCBP 840 until the upper-limit is reached. Note that in scanning the low-resolution area, in certain embodiments, different scan orders may be used instead of the conventional raster-scan; for example, in one embodiment, the center blocks in the area are used first, spiraling to the outer blocks in the area.

In another embodiment, the blocks can be scanned in the area in the low-resolution frame, and ranked according to a measurement of their corresponding motion quality. The blocks can be chosen from the top rank down until the limit is reached.

It is noted that the foregoing allows parallel processing of multiple patches in the destination domain, since a patch may be processed independently of other patches. Another advantage is the relatively lower requirement of on-chip storage, since only a number of patches are required for high-resolution storage.

Although some redundant operations may occur in the MCBP 840 due to the fact that the patch size is larger than the destination block size, this can be reduced by appropriately choosing the patch sizing and using cache.

In other embodiments, instead of using the destination domain, the source domain can be used. A stripe in the low resolution frames can be defined as a row of blocks, each block having a size of block_size_x*block_size_y, and all being aligned with the block grids in the low-resolution frame. Shown in FIG. 11 are a stripe in a low-resolution frame LR(n+j) and the area in SP(n) that may be potentially impacted by the stripe in MCBP.

Figure 11:
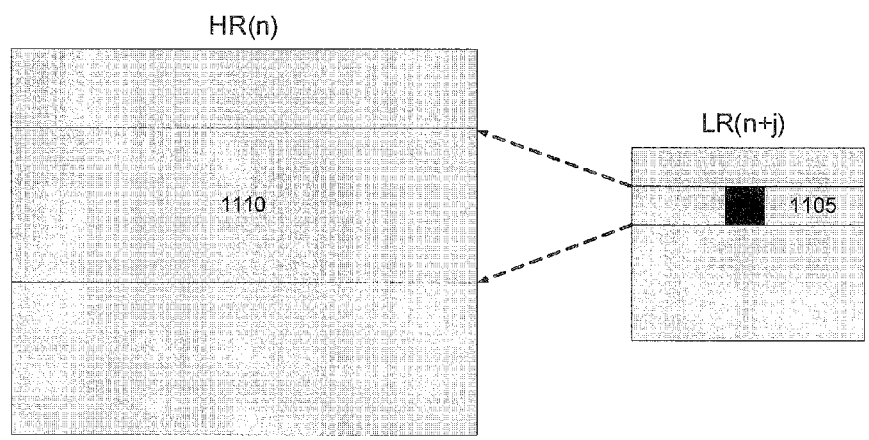
FIG. 11 is a block diagram of an exemplary source domain stripe in accordance with an embodiment of the present invention.

Referring now to FIG. 11, there is illustrated a block diagram describing an exemplary stripe 1105 in a lower resolution frame LR and the corresponding area 1110 in the higher resolution frame. The blocks of each stripe are back projected to the higher resolution frame following a certain order.

Figure 12:
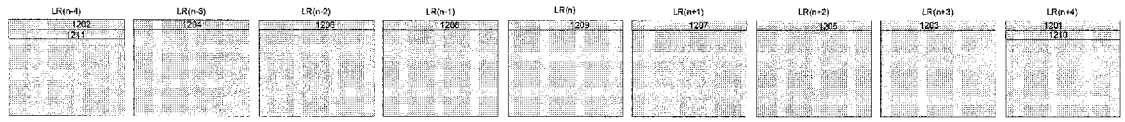
FIG. 12 is a block diagram describing an exemplary order of processing source domain stripes in accordance with an embodiment of the present invention.

Referring now to FIG. 12, there is illustrated a block diagram describing an exemplary order for the MCBP 840 in accordance with an embodiment of the present invention. The stripes are processed in the order 1201, 1202, 1203, . . . , 1210, 1211.

In certain embodiments of the present invention, the blocks in the two co-located stripes in LR(n±j) may be processed in ping-pong fashion; i.e., process a first block in 1201 in the MCBP 840, then process a first block in 1202 which may be co-located with the first block in 1201, then a second block in 1201, then a second block in 1202 which may be co-located with the second block in 1201, and so on.

Figure 13:
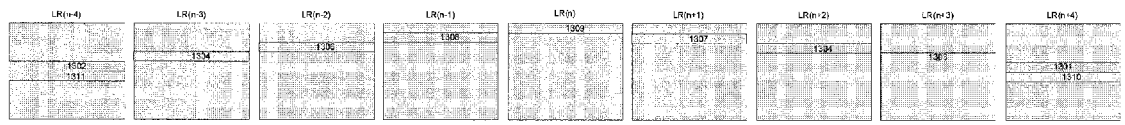
FIG. 13 is a block diagram describing another exemplary order of processing source domain stripes in accordance with an embodiment of the present invention.

In certain embodiments of the present invention, the MCBP 840 may process in a stripe-based manner, top-to-bottom spatially and far-to-near (relative to LR(n)) temporally, but with some vertical offsets among the stripes at the low-resolution frames. Referring now to FIG. 13, there is illustrated an exemplary order for the MCBP 840. The MCBP 840 proceeds starting with stripe 1301, and proceeds to 1302 . . . 1311.

A high-resolution buffer in MCBP may still be shared among the MCBP processes for the low-resolution frames, since the motion ranges and thus the sizes of the MCBP support normally decrease as the temporal distance from LR(n+j) to LR(n) decreases.

In certain embodiments of the present invention, the blocks in the two co-located stripes in LR(n±j) may be processed in ping-pong fashion; i.e., process a first block in 1301 in the MCBP 840, then process a first block in 1302 which may be co-located with the first block in 1301, then a second block in 1301, then a second block in 1302 which may be co-located with the second block in 1301, and so on.

In certain embodiments of the present invention, the MCBP 840 can process the blocks in the multiple low-resolution frames in the following order. For each block in a low-resolution frame, a block-coordinate (bx, by) is assigned which specifies its block-column position and block-row position. The top-left block in a low-resolution frame has the coordinate of (0, 0). An example process order at any moment in MCBP is shown in the following, using the case of 9 low-resolution frames as an example:

(bx, by) in 1301
(bx, by) in 1302
(bx−offset3_H, by−offset3_V) in 1303
(bx−offset3_H, by−offset3_V in 1304
(bx−offset2_H, by−offset2_V) in 1305
(bx−offset2_H, by−offset2_V) in 1306
(bx−offset1_H, by−offset1_V) in 1307
(bx−offset1_H, by−offset1_V in 1308
(bx−offset0_H, by−offset0_V) in 1309

In the above, offset3_H/V, offset2_H/V, offset1_H/V, and offset0_H/V are offsets in blocks in the horizontal and vertical directions, all relative to the position of the current block in LR(n±4). If the foregoing offsets are properly chosen, the MCBP 840 processes may potentially be performed in parallel within a shared high-resolution buffer.

Figure 14:
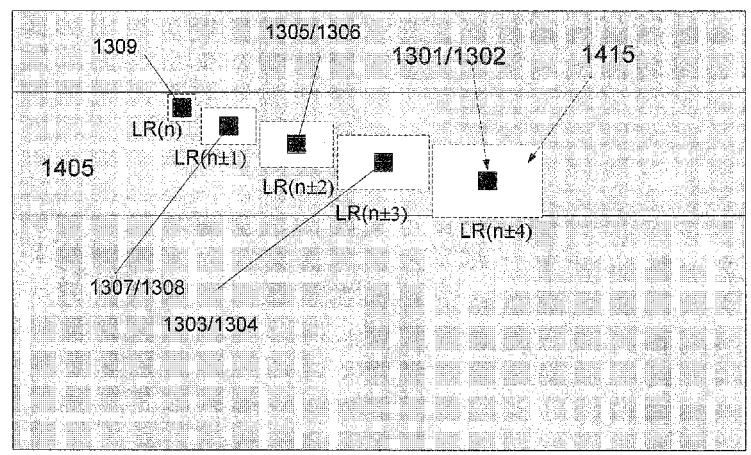
FIG. 14 is a block diagram describing a portion of a high resolution frames mapped to a buffer.

Referring now to FIG. 14, there is illustrated an exemplary higher resolution frame mapped to a shared buffer in accordance with an embodiment of the present invention. It is noted that the areas impacted 1415 by the current blocks in 1301 . . . 1309 do not overlap with each other.

Accordingly, a high-resolution buffer may be shared between the MCBP 840 processes for the multiple low-resolution frames. Additionally, the MCBP 840 can perform the foregoing processes in parallel. Additionally, bandwidth efficiency in accessing the blocks of the low-resolution frames is improved, as a result of the stripe based pattern.

Figure 15:
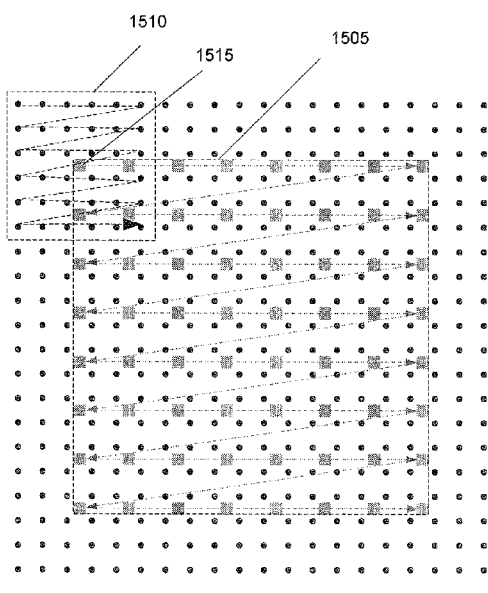
FIG. 15 is a block diagram describing pixel level parallel processing in accordance with an embodiment of the present invention.

Referring now to FIG. 15, there is illustrated a block diagram describing a parallel processing at the pixel level in the MCBP 840. A block of 8×8 pixels 1505 in a low-resolution frame share the same motion, and that 6×6 pixels 1510 in a higher resolution frame are used in simulating a low-resolution pixel 1515. For the 8×8 pixels in each low-resolution block, a raster-scan order may be followed in the MCBP 840. Note that MCBP 840 in this manner is essentially sequential in two senses:

(i) the high-resolution pixels updated in processing the current low-resolution pixel are subject to further updating in processing the subsequent low-resolution pixels in the block;

(ii) in simulating a low-resolution pixel, the previously updated high-resolution pixels are used.

Figure 16:
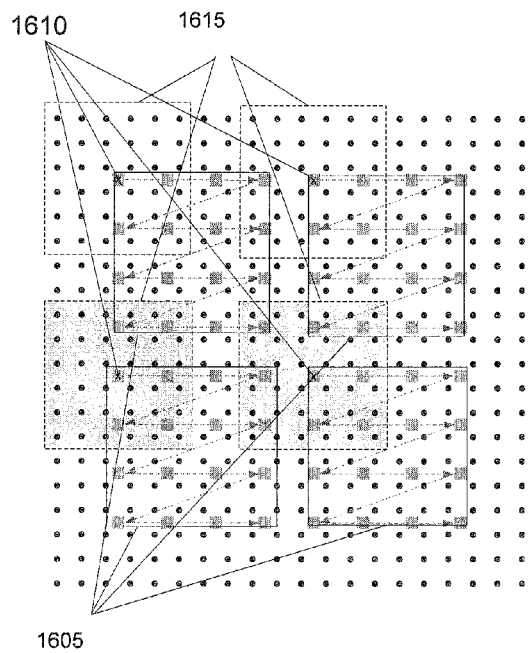
FIG. 16 is a block diagram describing another exemplary pixel level parallel processing in accordance with an embodiment of the present invention.

Referring now to FIG. 16, in certain embodiments of the present invention, the 8×8 pixels 1505 in a low-resolution block can be partitioned into 4 quadrants 1605, and each of which contains 4×4 pixels with a top-left pixel 1610. Shown also are the high-resolution areas 1615 that are impacted by the four pixels top-left pixels 1610. Note that if 6×6 pixels in the higher resolution are used to simulate a low-resolution pixel and thus are impacted by the low-resolution pixel, the four high-resolution areas 1615 corresponding to these four pixels 1610 do not overlap each other. Therefore, in MCBP, these four low-resolution pixels 1610 may be processed in parallel, assuming sufficient hardware resources exist. After the four pixels 1610 are processed, the four pixels to the right of the four pixels 1610 in the four quadrants may be processed in parallel, and so on until all the pixels in the block are processed.

It is noted that in certain embodiments of the present invention, within the four quadrants in 1615, other scan orders may be followed instead of the conventional raster scanning order. Additionally, in certain embodiments, different numbers of low-resolution pixels may be processed in parallel.

As well, if a measure of motion quality is available at pixel-level, the MCBP 840 behavior may be adapted accordingly. For example, the strength of MCBP 840 may be increased for a low-resolution pixel having a smaller local SAD and decrease the strength of MCBP 840 for a low-resolution pixel having a larger local SAD, where the local SAD of a low-resolution pixel z may be calculated as the sum-of-absolute-difference between a window of pixels in LR(n+j) surrounding z and the corresponding motion-compensated pixels in LR(n).

Note that this method does not require motion estimation at pixel-level but still offers pixel-level adaptive-ness in MCBP. An upper-limit may be be imposed on the number of pixels in a low-resolution block that are allowed to use in MCBP, for the potential benefit of reducing computation cycles for each low-resolution block. In such case, a fixed scan order of the low-resolution pixels in a block can be followed until the upper-limit is reached, or the pixels in the block can be ranked according to some pixel-level motion quality measurement the top-ranked pixels are chosen until the upper-limit is reached.

In certain embodiments of the present invention, the foregoing allows a lower operation frequency of the MCBP 840 hardware, due to the parallel processing at pixel level. Another advantage is that it may be superior to the conventional raster scanning order in terms of the resulting picture quality, since it allows the effects of MCBP to diffuse across the resultant high-resolution frame more evenly in all directions, rather than imposing a diffusion from top-left to bottom-right within, across the entire frame.

In certain embodiments of the present invention, the methods described in the above may be applied to both luma and chroma, or to luma only. In another embodiment, the pixel-level parallel MCBP may be used together with the destination-domain patch-based processing or the source-domain stripe-based processing.

Example embodiments of the present invention may include such systems as personal computers, personal digital assistants (PDAs), mobile devices (e.g., multimedia handheld or portable devices), digital televisions, set top boxes, video editing and displaying equipment and the like.

The embodiments described herein may be implemented as a board level product, as a single chip, application specific integrated circuit (ASIC), or with varying levels of the system integrated with other portions of the system as separate components. Alternatively, certain aspects of the present invention are implemented as firmware. The degree of integration may primarily be determined by the speed and cost considerations.

While the present invention has been described with reference to certain embodiments, it will be understood by those skilled in the art that various changes may be made and equivalents may be substituted without departing from the scope of the present invention.

Therefore, it is intended that the present invention not be limited to the particular embodiment disclosed, but that the present invention will include all embodiments falling within the scope of the appended claims and equivalents thereof.

The invention claimed is:

1. A system for receiving lower resolution frames and generating higher resolution frames, said system comprising:
   an upsampling circuit that generates an upsampled frame from a particular lower resolution frame;
   a first circuit that maps blocks from lower resolution frames that are proximate to the particular lower resolution frame to the particular lower resolution frame; and
   a second circuit that updates the upsampled frame with two or more blocks from at least one of the lower resolution frames that are proximate to the particular lower resolution frame.

2. The system of claim 1, wherein the two or more blocks are from a same one of the at least one of the lower resolution frames that are proximate to the upsampled frame.

3. The system of claim 1, wherein the two or more blocks are from different ones of the lower resolution frames that are proximate to the upsampled frame.

4. The system of claim 3, wherein
   at least one of the lower resolution frames that are proximate to the particular lower resolution frame is temporally prior to the particular lower resolution frame; and
   at least another one of the lower resolution frames that are proximate to the particular lower resolution frame is temporally after the particular lower resolution frame.

5. The system of claim 3, wherein each of the lower resolution frames that are proximate to the particular lower resolution frame is temporally prior to the particular lower resolution frame.

6. The system of claim 3, wherein each of the lower resolution frames that are proximate to the particular lower resolution frame is temporally after the particular lower resolution frame.

7. The system of claim 1, wherein
   each block comprises a plurality of pixels; and
   the second circuit further updates the upsampled frame with two or more pixels from one of the blocks.

8. The system of claim 1, further comprising a buffer, wherein a portion of the upsampled frame is mapped to the buffer, and the second circuit further updates the portion of the upsampled frame that is mapped to the buffer using the two or more blocks.

9. An apparatus for receiving lower resolution frames and generating higher resolution frames, said apparatus comprising:
   an integrated circuit, said integrated circuit comprising:
   a computer readable medium that stores a plurality of executable instructions; and
   a processor connected to the computer readable medium and configured by execution of the instructions to:
      generate an upsampled frame from a particular lower resolution frame;
      map blocks from lower resolution frames that are proximate to the particular lower resolution frame to the particular lower resolution frame; and
      update the upsampled frame with two or more blocks from at least one of the lower resolution frames that are proximate to the particular lower resolution frame.

10. The apparatus of claim 9, wherein the two or more blocks are from a same one of the at least one of the lower resolution frames that are proximate to the upsampled frame.

11. The apparatus of claim 9, wherein the two or more blocks are from different ones of the lower resolution frames that are proximate to the upsampled frame.

12. The apparatus of claim 11, wherein
at least one of the lower resolution frames that are proximate to the particular lower resolution frame is temporally prior to the particular lower resolution frame; and
at least another one of the lower resolution frames that are proximate to the particular lower resolution frame is temporally after the particular frame.

13. The apparatus of claim 11, wherein each of the lower resolution frames that are proximate to the particular lower resolution frame is temporally prior to the lower resolution particular frame.

14. The apparatus of claim 11, wherein each of the lower resolution frames that are proximate to the particular lower resolution frame is temporally after the lower resolution particular frame.

15. The apparatus of claim 9, wherein
each block comprises a plurality of pixels; and
the processor is further configured to update the upsampled frame with two or more pixels from one of the blocks.

16. The apparatus of claim 9, wherein the integrated circuit further comprises a buffer connected to the processor, a portion of the upsampled frame is mapped to the buffer, and the portion of the upsampled frame that is mapped to the buffer is updated using the two or more blocks.

17. A method for receiving lower resolution frames and generating higher resolution frames, comprising:
generating, by a processor, an upsampled frame from a particular lower resolution frame;
mapping, by the processor, blocks from lower resolution frames that are proximate to the particular lower resolution frame to the particular lower resolution frame; and
updating, by the processor, the upsampled frame based on pixels from at least two blocks from at least one of the lower resolution frames that are proximate to the particular lower resolution frame.

18. The method of claim 17, wherein the at least two blocks are from a same one of the at least one of the lower resolution frames that are proximate to the upsampled frame.

19. The method of claim 17, wherein the at least two blocks are from different ones of the lower resolution frames that are proximate to the upsampled frame.

20. The method of claim 17, wherein
at least one of the lower resolution frames that are proximate to the particular lower resolution frame is temporally prior to the particular lower resolution frame; and
at least another one of the lower resolution frames that are proximate to the particular lower resolution frame is temporally after the particular lower resolution frame.

* * * * *